United States Patent
Matus

(10) Patent No.: US 10,154,382 B2
(45) Date of Patent: Dec. 11, 2018

(54) SYSTEM AND METHOD FOR DETERMINING A DRIVER IN A TELEMATIC APPLICATION

(71) Applicant: Zendrive, Inc., San Francisco, CA (US)

(72) Inventor: Jonathan Matus, San Francisco, CA (US)

(73) Assignee: Zendrive, Inc., San Francisco, CA (US)

( * ) Notice: Subject to any disclaimer, the term of this patent is extended or adjusted under 35 U.S.C. 154(b) by 98 days.

(21) Appl. No.: 15/401,761

(22) Filed: Jan. 9, 2017

(65) Prior Publication Data

US 2017/0142556 A1 May 18, 2017

Related U.S. Application Data

(63) Continuation-in-part of application No. 14/206,721, filed on Mar. 12, 2014, and a continuation-in-part of application No. 15/243,513, filed on Aug. 22, 2016, now Pat. No. 9,733,089.

(60) Provisional application No. 61/778,209, filed on Mar. 12, 2013, provisional application No. 62/207,461, filed on Aug. 20, 2015.

(51) Int. Cl.
| | |
|---|---|
| *H04W 4/02* | (2018.01) |
| *H04Q 9/00* | (2006.01) |
| *G10L 25/48* | (2013.01) |
| *H04W 76/10* | (2018.01) |
| *H04W 4/04* | (2009.01) |
| *H04W 88/04* | (2009.01) |

(52) U.S. Cl.
CPC ............. *H04W 4/046* (2013.01); *G10L 25/48* (2013.01); *H04Q 9/00* (2013.01); *H04W 4/027* (2013.01); *H04W 76/10* (2018.02); *H04Q 2209/50* (2013.01); *H04W 88/04* (2013.01)

(58) Field of Classification Search
CPC ..... H04W 4/046; H04W 76/10; H04W 4/027; H04W 76/02; H04W 88/04; G10L 25/48; H04Q 9/00; H04Q 2209/50
USPC ......................................................... 701/447
See application file for complete search history.

(56) References Cited

U.S. PATENT DOCUMENTS

| | | | |
|---|---|---|---|
| 6,055,477 A | 4/2000 | McBurney et al. | |
| 8,054,168 B2 | 11/2011 | McCormick et al. | |
| 8,326,257 B2 | 12/2012 | Shiu et al. | |
| 8,395,542 B2 | 3/2013 | Scherzinger et al. | |
| 8,521,193 B2 | 8/2013 | Paek et al. | |
| 8,577,703 B2 | 11/2013 | McClellan et al. | |
| 8,634,822 B2 | 1/2014 | Silver et al. | |
| 8,971,927 B2 | 3/2015 | Zhou et al. | |
| 8,972,103 B2 | 3/2015 | Elwart et al. | |
| 9,064,412 B2 | 6/2015 | Baur | |
| 9,121,940 B2 | 9/2015 | Psiaki et al. | |
| 9,185,526 B2 | 11/2015 | Guba et al. | |
| 9,188,451 B2 | 11/2015 | Magnusson et al. | |
| 9,221,428 B2 | 12/2015 | Kote et al. | |
| 9,222,798 B2 | 12/2015 | Curtis et al. | |

(Continued)

*Primary Examiner* — Aaron L Troost
*Assistant Examiner* — Paula L Schneider
(74) *Attorney, Agent, or Firm* — Jeffrey Schox

(57) ABSTRACT

A system and method for a telematic application on a mobile electronic device that can include detecting, in the telematic application, vehicular travel; collecting, in the telematic application, driver status identification data; determining a driver status based on the driver status identification data; recording the driver status; and recording telematic data based on the driver status.

17 Claims, 7 Drawing Sheets

(56) References Cited

U.S. PATENT DOCUMENTS

| | | |
|---|---|---|
| 9,250,090 B2 | 2/2016 | Hille et al. |
| 9,390,625 B2 | 7/2016 | Green et al. |
| 9,558,520 B2 | 1/2017 | Peak et al. |
| 2006/0153198 A1* | 7/2006 | Chadha ................ H04L 69/329 370/395.2 |
| 2009/0024419 A1* | 1/2009 | McClellan ............ G06Q 40/02 705/4 |
| 2010/0299021 A1 | 11/2010 | Jalili |
| 2011/0077028 A1 | 3/2011 | Wilkes, III et al. |
| 2012/0226421 A1* | 9/2012 | Kote ...................... B60R 25/20 701/51 |
| 2013/0041521 A1 | 2/2013 | Basir et al. |
| 2013/0069802 A1 | 3/2013 | Foghel et al. |
| 2013/0211618 A1 | 8/2013 | Iachini |
| 2014/0358394 A1* | 12/2014 | Picciotti ............. G06F 21/6218 701/70 |
| 2015/0084757 A1 | 3/2015 | Annibale et al. |
| 2016/0021238 A1* | 1/2016 | Abramson ........... H04W 48/04 455/418 |

\* cited by examiner

SYSTEM AND METHOD FOR DETERMINING A DRIVER IN A TELEMATIC APPLICATION

CROSS-REFERENCE TO RELATED APPLICATIONS

This application is a continuation-in-part of prior U.S. application Ser. No. 14/206,721, filed on 12 Mar. 2014, which claims the benefit of U.S. Provisional Application Ser. No. 61/778,209, filed on 12 Mar. 2013, which are both incorporated in their entirety by this reference.

This application is also a continuation-in-part of prior U.S. application Ser. No. 15/243,513, filed on 22 Aug. 2016, which claims the benefit of U.S. Provisional Application Ser. No. 62/207,461, filed on 20 Aug. 2015, which are both incorporated in their entirety by this reference.

TECHNICAL FIELD

This invention relates generally to the vehicle telematics field, and more specifically to a new and useful system and method for determining a driver status in a telematic application in the vehicle telematics field.

BACKGROUND

Vehicle telematic devices monitor the location, movements, status, and behavior of a vehicle. Such devices commonly use GPS receivers and an electronic device to transmit the collected data. The vehicle telematic devices may additionally include capabilities to interface with signals from the car. Such devices are often installed in the car or vehicle. Mobile phones contain similar sensing capabilities as telematic devices installed on the device and are owned by more people. However, mobile phones are often carried with a person, and vehicle travel experienced by a device may be when the owner is driving, a passenger in a car, a passenger on public transportation, or during any state of travel. Thus, there is a need in the vehicle telematic field to create a new and useful system and method for determining a driver status in a telematic application. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Methods for Determining a Driver in a Telematic Application

Figure 1:
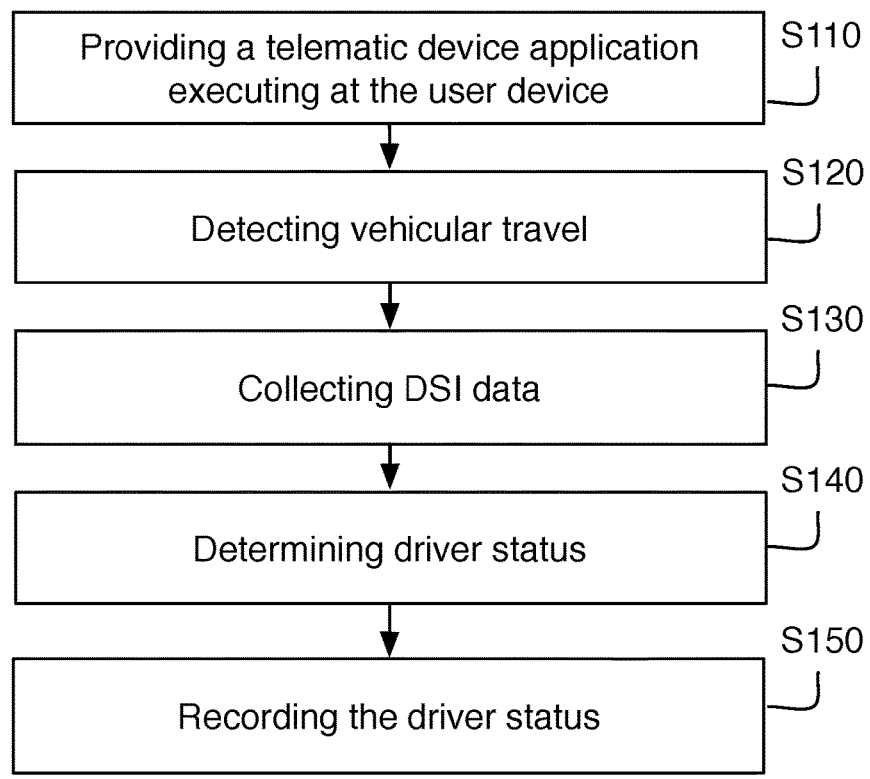
FIG. 1 is a flowchart representation of a method of a preferred embodiment.

As shown in FIG. 1, a method for determining a driver status in a telematic application can include providing a telematic application S110, detecting vehicular travel S120, collecting driver status identification (DSI) data S130, determining a driver status S140, and recording the driver status S150.

The method functions to determine when a user of a device is driving or not driving. Knowing when a user is driving a vehicle or not can enable telematic data to be collected by a user device (e.g., mobile electronic device) and associated with the appropriate person. In one exemplary implementation, collecting telematic data and the driver associated with that data can be used in evaluating the risk of insuring a driver. As one application, a remote software platform can host and manage driving data for a plurality of different drivers. The drivers may each have a telematics application installed on a personal, mobile computing device that automatically detects when the user is driving and collects telematics data. Thus, the telematics application can be programmed in computer code to execute one or more blocks of the method 100 described herein, upon download, installation, and/or running of the telematics application on the mobile computing devices of the drivers. The instances of the telematics application running at mobile computing devices can coordinate one or more of: data collection, data transfer, data analysis, and feedback to the drivers or other entities (e.g., insurance providers) according to the method 100 described herein.

As driver determination is automatically performed by instances of the application in communication with computing systems programmed to be operable for analysis of driver and driving data, driving data can be collected in any vehicle and used to identify the driver(s) of the vehicle(s). Additionally or alternatively, telematics data can be collected in situations when the user is a passenger, and data is acquired by way of a telematic application executing at the computing device of the passenger. In insurance use case passenger telematics data could be mapped to social connections of the user or used in any suitable manner. The method may alternatively be used in any suitable application. The method may be implemented through various techniques and combinations of techniques for collecting driver status signals and determining driver status. Such variations may rely on car-based devices, audio detection, and/or physical event detection.

Step S110, which includes providing a telematic application, functions to enable a telematic logging software to be operable on a mobile electronic device. The telematic application is preferably operable on a mobile electronic device associated with a single entity. The method may, in some variations, create an association between the application instance and a particular user account. In this way, driving telematic data may be logged for a particular user. In another variation, the identity of a car may be identified by the application, and the telematic data and/or driver status may be logged for a particular vehicle. The user device is preferably a mobile phone, but may alternatively be a wearable computing device, a tablet, a personal data-logging device, or any suitable device.

The method can include coupling the user device (e.g., mobile electronic device) to a vehicle. The user device can remain coupled to the vehicle throughout (or substantially throughout) a time period (e.g., throughout a driving session during which the vehicle is driven), can be coupled to and decoupled from the vehicle one or more times throughout the time period, and/or can be coupled to the vehicle at any other suitable time.

The user device is preferably movably coupled to the vehicle. In a first embodiment, the user device is movably coupled to the vehicle through a user (e.g., vehicle driver, vehicle passenger). In a first variation of this embodiment, the user device is retained by an article of clothing of the user (e.g., in a pocket; by a belt of waistband, such as in a holster connected to the belt or waistband; etc.). In a second variation of this embodiment, the user device is held by the user (e.g., in the user's hand hand; between two body parts, such as between the user's face and shoulder or between the user's arm and torso; etc.). In a third variation of this embodiment, the user device rests (e.g., is retained by gravity) on the user (e.g., on the user's lap). In a third variation of this embodiment, the user device is worn by the user (e.g., in a sleeve, in the form factor of a limb-coupled mobile device, etc.).

In a second embodiment, the user device is movably coupled to the vehicle by a mount (e.g., mount attached to the vehicle). The mount can be removably or irremovably attached (e.g., by a suction element, magnet, adhesive, mechanical fastener, clip, friction fit, etc.) to the vehicle (e.g., windshield, dashboard, vent cover, etc.), be of unitary construction with the vehicle, or be otherwise suitably coupled to the vehicle. The mount can be removably or irremovably attached (e.g., by a suction element, magnet, adhesive, mechanical fastener, clip, friction fit, etc.) to the user device or be otherwise suitably coupled to the user device. The mount can be a rotatable mount operable to rotatably couple the user device to the vehicle (e.g., allowing rotation of the user device about one or more axes with respect to the vehicle). In a third embodiment, the user device rests (e.g., is retained by gravity) on the vehicle (e.g., on a substantially horizontal surface, in a cup holder, etc.). Alternatively, the user device can be immovably coupled to the vehicle (e.g., rigidly connected to the vehicle), or coupled to the vehicle in any other suitable way.

The telematic application is preferably an application downloaded and installed on the device, but the application may alternatively be embedded in the device, operated through a browser, or installed on the device in any suitable manner. The telematic application may at least partially operate in the background. The background operation of the telematic application preferably functions to detect and record vehicle data. The telematic application may additionally interface with services provided by the operating system or other frameworks to efficiently monitor and collect telematic data.

The telematic application can preferably provide data on location and routes, movements, driving patterns (e.g., steering and braking characteristics), and other properties. The telematic application preferably uses services and sensors accessible on the mobile device such as GPS sensors, location services, accelerometers, gyroscopes, presence sensors, and/or any suitable input signal accessible by the application. The telematic data may be used with outside data sources to correlate additional properties of driving. The additional properties of driving may be generated on the telematic application or alternatively by a remote telematic data platform. The telematic application preferably communicates data to the remote telematic data platform for hosting, processing, and sharing. Additionally, properties of driving may include traffic level of travel, speed relative to flow of traffic, observance of traffic laws (e.g., does the driver stop at stop signs), driving weather, and/or other suitable driving properties.

Step S120, which includes detecting vehicular travel, functions to measure when the mobile electronic device experiences vehicular travel. Vehicular travel is preferably characterized by travel patterns expected from a powered vehicle such as a car, truck, train, bus, motorcycle, plane, helicopter, boat, jet ski, or any suitable vehicle. For cars and other road-based vehicles, vehicular travel may be characterized by traveling within particular speed ranges and/or following a travel route consistent with roads and traffic patterns. For example, motion data that indicates that a mobile electronic device is currently traveling substantially along a highway route at 60 mph would preferably be a strong indicator that the mobile electronic device is experiencing vehicular travel. The telematic application preferably detects vehicular travel for logging telematic data as described above, and the telematic application may use such data in identifying vehicular travel patterns evident in the telematic data. The telematic application may additionally selectively enable or disable logging. Selectively enabling and disabling logging may be based in part on if the device is experiencing vehicular travel. Additionally, the detection of vehicular travel may activate or initiate the collection of driver status signals and the determination of driver status. For example, a telematic application may periodically monitor the location of a device. When the application detects the devices is traveling at car-like speeds, the telematic application may detect if the device is in a driver mode. Alternatively, determining that the driver status is in a driving mode may activate or initiate the detection of vehicular travel. For example, in a variation where the telematic application detects a beacon signal, the presence of the beacon signal may initiate detection of vehicular travel. S120 is preferably performed while the user device is coupled to the vehicle (e.g., movably coupled during the time period), but can additionally or alternatively be performed at any other suitable time.

Step S130, which includes collecting driver status identification (DSI) data, functions to collect data to allow identification of a driver status for a user of the telematic application. The user is preferably the primary user of the mobile electronic device running the telematic application, but may additionally or alternatively be any other user. DSI data preferably includes any data that could be used to identify the driver status of the user and/or the driver status of a vehicle the user is traveling in; e.g., whether the user is driving or not, how the user is driving/being driven, and what vehicle the user is driving/being driven in. DSI data is preferably collected from sensors of the mobile electronic device, but may additionally or alternatively be collected from any suitable source; e.g., sensors integrated into or external to the vehicle. DSI data is preferably collected by a telematic application running on the mobile electronic device, but may additionally or alternatively be collected by any suitable device. Collecting DSI data S130 may include collecting device position data S131, collecting device motion data S132, collecting vehicle motion data S133, collecting vehicle identifying data S134, collecting vehicle use data S135, and/or collecting device use data S136. S130 is preferably performed while the user device is coupled to the vehicle (e.g., moveably coupled during the time period), but can additionally or alternatively be performed at any other suitable time.

Collecting DSI data S130 preferably includes collecting DSI data selectively. For example, DSI data may only be collected while vehicular motion is detected. As another example, the types of DSI data collected may change based on the status of the mobile electronic device, a vehicle and/or the user; GPS data from the mobile electronic device may only be collected when the mobile electronic device is connected to an external power source, while accelerometer data may be collected at all times. The status of the mobile electronic device, a vehicle, and/or the user may additionally or alternatively modify the frequency or other parameters of DSI data collection. For example, GPS data from the mobile electronic device may be collected once every ten seconds when the mobile electronic device is not connected to an external power source and continuously when the mobile electronic device is connected to an external power source.

Step S131, which includes collecting device position data, functions to collect data on the position of the mobile electronic device. Collecting device position data S131 preferably includes determining the position of the mobile electronic device relative to the vehicle experiencing vehicular travel, but may additionally or alternatively include determining the position of the mobile electronic device relative to any other references (e.g., another person, a building, the earth). Device position relative to the vehicle may help identify a driver status in a number of ways; for instance, a particular user may always place his or her mobile electronic device in a particular cupholder when driving his or her primary vehicle. As another example, if a user's mobile electronic device is in a passenger seat of a vehicle, it is unlikely that the user is driving the vehicle. Device position relative to other references may also help identify a driver status in a number of ways; for instance, if the device is positioned somewhere in the middle of the Atlantic Ocean, it is unlikely that the user is in a car. As another example, if the user is in close proximity to a large number of other users, it is also unlikely that the user is in a car. Collecting device position data S131 preferably includes receiving device position data from a sensor of the mobile electronic device (e.g., from a GPS sensor) but may additionally or alternatively include receiving device position data from any other suitable source. Collecting device position data S131 may additionally or alternatively include processing received position data. Device position data and position data of a reference may be processed to create device position data relative to the reference; for example, GPS data from the mobile electronic device and GPS data from a GPS sensor attached to the vehicle may be processed to provide a position of the mobile electronic device relative to the vehicle. As another example, a number of mobile electronic devices may communicate the signal strengths of all detected devices over Bluetooth to each other; this data may be processed to determine the position of one mobile electronic device relative to the others.

In a first variation, collecting device position data S131 may include detecting a beacon signal and processing detected beacon signal data to determine the position of the mobile electronic device relative to a beacon, set of beacons, or other reference point. The beacon signal is preferably a signal sent by one or more beacons to allow device position relative to the beacons to be established. The signal is preferably a Bluetooth signal, but may alternatively be any other suitable signal for determining device position; e.g., Wi-Fi, radio, visible light, infrared, sonic, ultrasonic, NFC, RFID. If there are multiple beacons, each beacon may produce identical signals, but they may additionally or alternatively produce distinct signals. Signals from multiple beacons may be distinguished by amplitude, duration, frequency, phase, type of signal (e.g., sonic vs. electromagnetic), and/or in any other suitable way. Beacons may be connected to each other by wires or may communicate with each other wirelessly. Beacons may transmit other signals than the beacon signal (for example, beacons capable of transmitting and receiving Bluetooth signals may also act as Bluetooth transponders for the vehicle or other system to be connected to the mobile electronic device). Instructions for producing the beacon signal (e.g., the beacon signal waveform) is preferably stored in the beacons, but additionally or alternatively may be transmitted to the beacons by the vehicle, mobile electronic device, or any other suitable source. If the beacons are connected to or in communication with the mobile electronic device, the mobile electronic device preferably has the ability to modify the beacon signal. For example, the mobile electronic device may reduce the amplitude of a beacon signal if position has been static and accelerometers in the mobile electronic device have not detected movement. As another example, the mobile electronic device may alter the beacon signal dynamically to confirm or improve position measurements.

Figure 2:
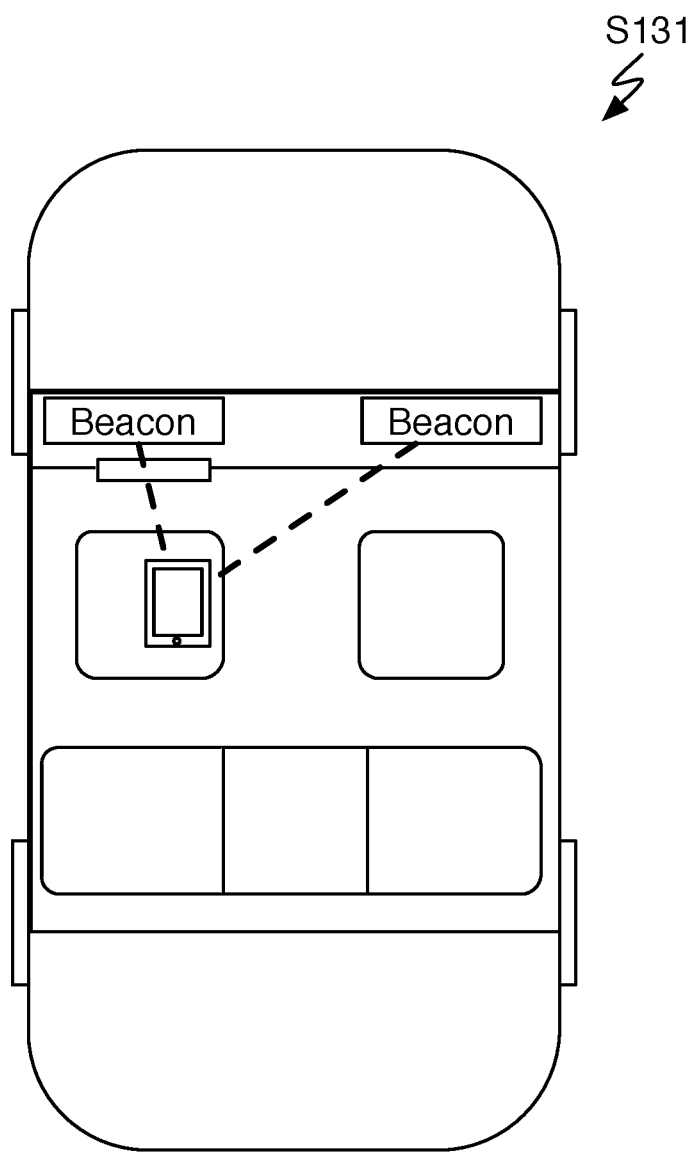
FIG. 2 is a schematic representation of detecting a beacon signal and determining position of a preferred embodiment.

Device position relative to the beacons may be established by triangulation, signal strength measurement, time of flight, and/or any other suitable method. The beacons are preferably positioned in a particular way to allow device position relative to the beacons to be processed into device position relative to the vehicle. For instance, if a beacon is placed on the driver's side window of a car, signal strength of the beacon as measured by the mobile electronic device may be correlated to a distance from the beacon. If there are four beacons placed in different positions (for instance, on each window of a car having four windows), signal strength from each beacon may be used to determine the location of the mobile electronic device in a coordinate system determined by the beacons. In an example embodiment of the first variation, as shown in FIG. 2, two beacons are mounted or positioned on opposite sides of a vehicle, allowing lateral position of the mobile electronic device to be determined (e.g., whether the mobile electronic device is on the driver or passenger side of the vehicle).

In a second variation, collecting device position data S131 may include sending a beacon signal over the stereo system of a vehicle. The beacon signal is preferably sent to the stereo system by the mobile electronic device, but additionally or alternatively arrive at the stereo system by any suitable method. The beacon signal is preferably a sound or sounds specifically intended as a beacon signal but may additionally or alternatively be based on a modification to other sound signals (e.g., modulating music being played over the speakers as a signal). The beacon signal may also be based on characteristics of the speakers; e.g., the right speaker signal is identified by a characteristic popping noise. The beacon signals played over each channel are preferably different to allow for location relative to each channel's speakers (for example, the right channel and left channel signals played may be different). The mobile electronic device can preferably determine position data from the signals by comparing the beacon signals recorded by a microphone of the mobile electronic device to a reference (such as the beacon signals as sent to the vehicle stereo system). Alternatively, the beacon signals played over each channel may be substantially similar in waveform but offset in phase from one another to create regions of constructive and destructive interference. The beacon signals are preferably changed over time (e.g., in frequency, in amplitude, and/or in phase) to move the regions of constructive and destructive interference. The regions of constructive and destructive interference are preferably correlated to positions in the car. This correlation may be determined from knowledge about the speaker positions (for example, if the vehicle identity is known, the speaker positions may also be known), estimations of speaker positions, or calibration data. An example calibration might involve asking a user to hold a phone still in a vehicle while different beacon signals are transmitted over the speakers while collecting calibration measurements of generated beacon signals. The user preferably is asked to hold the phone in a specific position (e.g., between driver and passenger seats at ear level), but alternatively may not be asked to hold the phone in a specific position.

In a third variation, collecting device position data S131 may include echolocation. To collect echolocation data, the mobile electronic device preferably sends a signal over a speaker contained within the mobile electronic device. After sending the signal, the mobile electronic device preferably records and analyzes sound using a microphone of the mobile electronic device. This sound is then processed; preferably an echo of the signal sent by the mobile electronic device is identified. By comparing the recorded echo to the signal sent, the mobile electronic device can preferably determine information about its position. The mobile electronic device preferably can determine device position data by comparing echo characteristics to echo characteristics of known locations. Alternatively, the mobile electronic device may simply correlate certain echo characteristics to particular users or driving statuses, or echo characteristics may be compared to any other suitable data.

Step S132, which includes collecting device motion data, functions to collect data on motion of the mobile electronic device. Device motion data may help identify driver status in a number of ways. In a first example, device position data may be inferred from device motion data; whenever a particular user drives, he places his phone in a cupholder, which bounces around in the cupholder with a motion characteristic to both the phone's position in the cupholder and the user's vehicle motion (discussed in Step S133). In a second example, vehicle motion data may be inferred from device motion data; if the GPS of a mobile electronic device shows the mobile electronic device traveling at 50 miles per hour, it is likely that the major component of the device motion data captured by GPS is due to vehicle motion, driver status could then be determined from inferred vehicle motion data as in Step S133. In a third example, device motion data may help directly identify driver status; a particular driver who always carries his phone in his pocket may move his leg in a characteristic manner (for example, from gas pedal to brake pedal following certain patterns) or may enter a vehicle on the driver's side in a characteristic manner (e.g. a device user may lean right when entering the driver's side and may lean left when entering the passenger's side) and thus move the phone in a substantially similar characteristic manner. This characteristic manner may be based on the gait of individuals and the way they handle vehicle doors, the specific vehicles they enter and the side from which they enter the vehicle. This characteristic manner might also be useful in determining vehicle identity (e.g. the characteristic motion of an individual entering a low-slung sports car is different than the characteristic motion of an individual entering a minivan). If device motion data is used directly, device motion data may be filtered to highlight or remove suspected vehicle motion data (for example, a long deceleration might be characteristic of a car slowing, while a short deceleration might be characteristic of a leg movement). Additionally or alternatively, device motion data may be processed with motion data from another source (e.g., accelerometer data might be compared with GPS data either from the mobile electronic device or from a sensor tied to the vehicle) to create isolated device motion data (i.e., device motion data with contributions from vehicle motion removed). Collecting device motion data S132 preferably includes collecting device motion data relative to a reference; the reference may be a positional reference (change in position relative to a reference position over time), an inertial reference (change in velocity relative to a reference velocity), or any other suitable reference. Alternatively, device motion data may be collected without relation to a reference. Collecting device motion data S132 preferably includes collecting device motion data from motion sensors (e.g., accelerometers, gyroscopes) of the mobile electronic device, but may additionally or alternatively include collecting device motion data from any suitable source. Collecting device motion data S132 may additionally or alternatively include collecting data on the position of the mobile electronic device over time and creating device motion data from the device position data; device position data is preferably collected as in Step S131, but may alternatively be collected in any suitable manner. Collecting device motion data S132 may additionally or alternatively include collecting any other data that could be used to infer device motion; for example, compass data could be collected over time to determine rotational motion, camera data could be used to determine motion through analysis of captured images over time, and barometer data could be collected over time to determine vertical motion.

Figure 3:
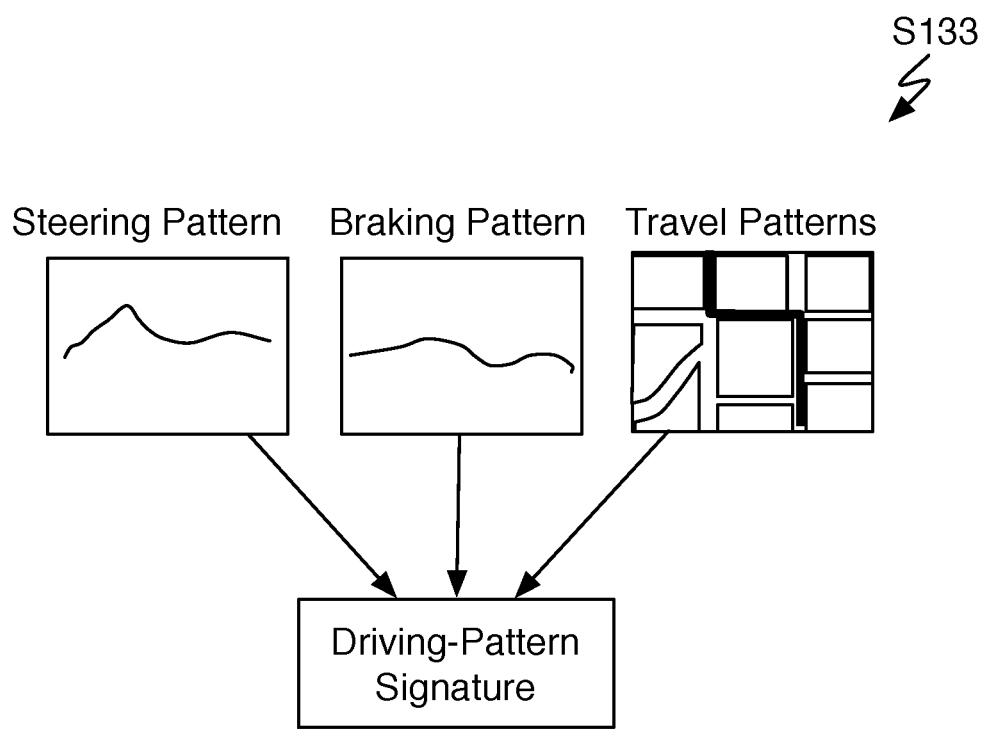
FIG. 3 is a schematic representation of collecting a driving-pattern signature of a preferred embodiment.

Step S133, which includes collecting vehicle motion data, functions to collect data on the motion of a vehicle the mobile electronic device is in, connected to, and/or attached to. Collecting vehicle motion data preferably includes collecting vehicle motion data from sensors connected to a vehicle (for example, a built in GPS sensor, or a GPS sensor attached to a vehicle's windshield), but may additionally or alternatively include inferring vehicle motion data from the device motion data or collecting vehicle motion data from any other suitable source. If vehicle motion data is inferred from device motion data, it is preferably isolated from device motion data in a substantially similar way as isolated device motion is produced from device motion data in Step S132 (although isolated vehicle motion would be complementary to isolated device motion). Vehicle motion data is preferably captured in substantially similar manners to device motion data, but may additionally or alternatively be captured in any suitable manner. Vehicle motion data may help to identify driver status in a number of ways; for instance, vehicle motion data may be used to create a driving pattern signature, as shown in FIG. 3.

A driving-pattern signature may be based on one or more signals. For example, driving route patterns may be used as a first signal. A user will typically follow particular routes. Driving along a particular route may indicate one user is the driver rather than another. For example, if two users often drive a family car, but the first user drives the car to work, and the second driver only drives the car on the weekend, then a travel route to or from work may indicate that the first driver is the driver. Style of driving controls may be a second signal. Collecting vehicle motion data may include collecting steering (e.g., changes in direction), acceleration, and braking data. Such data may be used to differentiate between drivers. In the example above, the first user may have an aggressive driving style, and the second user may have a more passive driving style. If the telematic application is sensing the vehicle experiencing slower speeds, smooth turns, and lower accelerations, then that may signal that the second user is the driver.

Step S134, which includes collecting vehicle identifying data, functions to collect data to identify a vehicle as a particular type of vehicle or a particular vehicle. Vehicle identifying data is preferably any data relating to the identity or type of a vehicle. Vehicle identifying data may help to determine driver status by leveraging correlations (either manually defined or otherwise inferred) between particular drivers and particular vehicles. For example, if a particular user usually drives a particular car to work, if the user is in that car during his or her normal commute time, there is a high likelihood that the user is driving the car. In some situations, a remote telematic platform and/or the telematic application can statistically predict which users are likely the primary drivers of a vehicle based on who is in the vehicle when the vehicle is driven. Alternatively, a vehicle identity signal may be explicitly associated with a vehicle.

Collecting vehicle identifying data S134 preferably includes collecting identifying data for a vehicle containing or linked to the mobile electronic device, but may additionally or alternatively include collecting identifying data for any relevant vehicle. Vehicle identifying data may include characteristic audio data (as shown in FIG. 4), characteristic vehicle motion data, signals transmitted by a vehicle, beacon identification data (as shown in FIG. 5), and/or any other suitable data.

Figure 4:
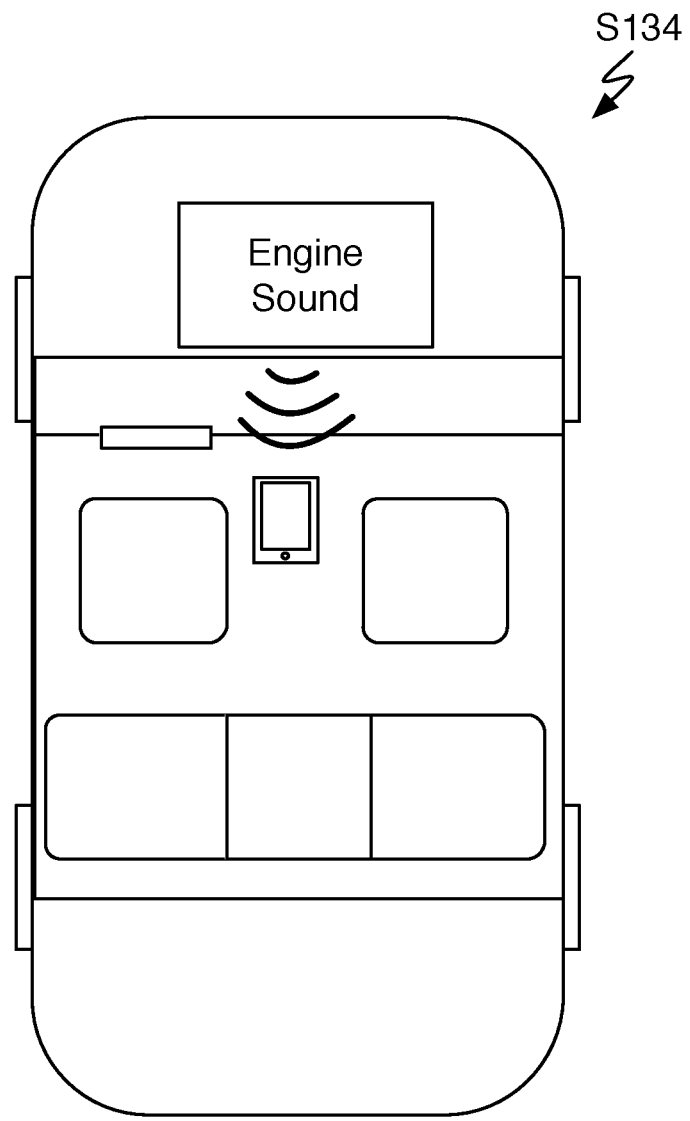
FIG. 4 is a schematic representation of collecting an audio signature of a preferred embodiment.
Figure 5:
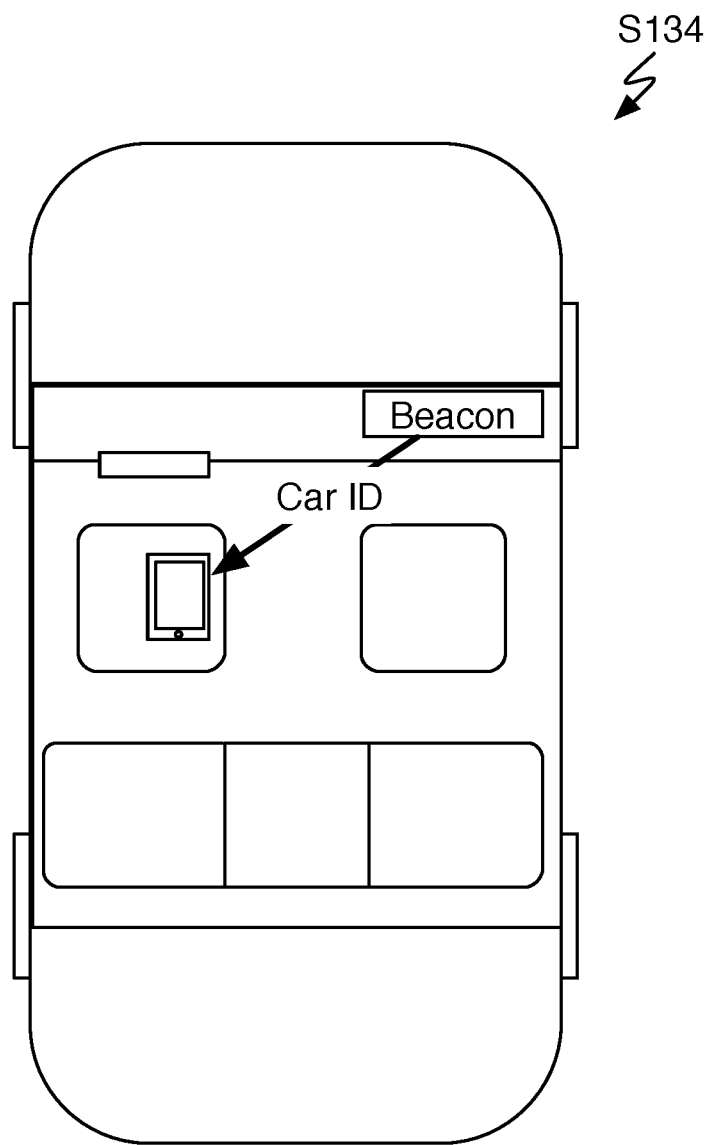
FIG. 5 is a schematic representation of detecting a vehicle identifying signal of a preferred embodiment.

Characteristic vehicle audio data preferably includes data that can identify a vehicle and/or users as shown in FIG. 4. Characteristic audio data is preferably an audio sampling or a plurality of audio samplings that can be used in matching the audio sample to other samples. Vehicles, particularly different models of cars, can have unique acoustical properties depending on the engine, sound insulation of the cabin, and other vehicle design properties. Additionally, usage patterns may impact characteristic audio data. For example, radio preferences (e.g., volume and type of music), phone positioning (e.g., keep phone in pockets, a purse, in a cup holder, on a dock, etc.), conversations, and other factors may impact the audio signature. Thus, Block S134 can include implementing one or more machine learning and signal processing algorithms, described below, configured for matching/identifying characteristic audio data and associating such characteristic audio data with the vehicle and/or users.

Characteristic vehicle motion data preferably includes vehicle motion data collected by Step S133 that is characteristic to a particular vehicle, as opposed to a particular driver. For example, it might be apparent from vehicle motion data that a vehicle has anti-lock brakes (from characteristic motion associated with the anti-lock brakes in low-traction scenarios), this could be used to distinguish the vehicle from vehicles without anti-lock brakes. As another example, vertical movement as measured in vehicle motion data may potentially be related to suspension in the vehicle (a vehicle with softer shocks will absorb jolts better) as opposed to a particular driving pattern.

Signals transmitted by a vehicle preferably include Wi-Fi, radio, visible light, infrared, sonic, ultrasonic, NFC, and/or RFID signals. Signals transmitted by a vehicle may additionally or alternatively include electronic signals, e.g., signals transmitted over an ODBII interface.

Beacon identification data, as shown in FIG. 5 preferably includes any signals sent by beacons containing data that could be linked to vehicle identity, with the beacons as described in Step S131. Additionally or alternatively, beacon identification data may include passive beacon identification data. For example, the beacon may be a phone dock in which a driver places their phone. The structure of the dock may include structural elements to induce identification of the vehicle. For example, the dock may include a bar code, identification number, or other visible identifiers that can be read by the telematic application through a camera of the device when the device is coupled to the dock. The beacon is preferably uniquely identifiable. As the beacon is preferably semi-permanently installed within a car (e.g., the beacon is left in the car over several trips), the beacon may additionally be uniquely associated with one vehicle. Additionally, a single driver can be associated with the beacon or vehicle. The driver may be explicitly associated with the beacon/vehicle, wherein a user registers the beacon in an account profile. Alternatively, the driver may be automatically associated with the beacon/vehicle based on data relating to when the user is present and the vehicle is being driven.

Step S135, which includes collecting vehicle use data, functions to collect data on how a vehicle is used. Vehicle use data preferably includes data relating to the use of a vehicle aside from vehicle motion data, but may additionally or alternatively include any data relevant to vehicle use. Vehicle use data may help to determine driver status by leveraging correlations between vehicle use patterns and particular drivers. For example, a particular user may usually turn on the radio to a particular station when driving, or may always adjust the driver's seat to a particular position. Vehicle use data is preferably collected by querying sensors within the vehicle, but alternatively may be collected by sensors in the mobile electronic device or may be collected in any suitable manner. Vehicle use data preferably includes data on any vehicle parameters that can be set or modified directly or indirectly by users; e.g., stereo settings, seat settings, seat sensor data (usually intended for airbags, but could be used to detect presence of passengers), climate control settings, window use data, door lock data, cruise control data, transmission data (including shifts and timing), windshield wiper data, and headlight data.

Step S136, which includes collecting device use data, functions to collect data on how the mobile electronic device is used. Device use data may help to determine driver status by leveraging correlations between device use patterns and driver status. For example, a particular user may text a lot if he or she is not driving, but may not text at all if he or she is driving. As another example, the telematic application may detect if a user is using other applications or services of the device. Such behavior may be used as an indicator that the user is not driving. Device use data may include data on when user input was last received by the mobile electronic device, user input data, data relating to application use, internet activity data, phone call activity data, text message activity data, device settings data, and/or any other data relating to how the mobile electronic device is used.

Step S140, which includes determining driver status, functions to use DSI data to determine the driver status. Driver status preferably includes data relating to the driver of a vehicle (e.g., the identity of the driver) and/or users of the telematic application. For example, driver status may identify the driver of a vehicle as a known user, a known driver who is not a known user, or an unknown driver. Driver status may additionally or alternatively provide information about whether the user of the mobile electronic device is driving or not.

In one variation, the patterns for the user of the telematic application and/or other drivers of a vehicle are collected and characterized through historical DSI data. If collected DSI data do not correspond to those of the user, then the device is preferably determined to be in a passenger mode (i.e., the user associated with the device is likely not the driver). If collected DSI data correspond to those of the user, then the device may be determined to be in a driver mode (i.e., the user associated with the device is likely the driver). Collected DSI data may also allow the mobile electronic device to determine that while the user of the mobile electronic device is not driving, the driver of a vehicle is another driver known to the telematic application. This other driver may be a user of the telematic application on another mobile electronic device or may simply be a driver known to the telematic application through collection of DSI data while the user was a passenger. Correlations between DSI data and particular drivers may be stored locally in the mobile electronic device, may be available to the mobile electronic device through the internet, or may be available in any other suitable manner. Storing correlations between DSI data and particular drivers in the cloud could allow for linked users; for example, allowing a person to collect DSI data for his or her spouse while a passenger. Historical data collected and maintained on a remote telematic platform may enable not only determining the driver status of the device actively sensing and relaying information, but also the driver status of other users that have historical data. For example, within a family, there may be multiple drivers of a particular car. If it is determined that the user is likely in the family car, and that a first family member is a passenger of the car, then it may also signal that a second family member is the driver. This may be accomplished even if the second family member does not have a device that is actively recording the trip. For example, a beacon may identify a device to be in a passenger seat of a particular car. The identified car may have a second driver (the second family member), to whom the DSI data may correspond.

In another variation, DSI data is compared to predicted patterns for particular drivers and/or users or to general DSI data indicators. Predicted patterns may be generated from identifying information of users and/or drivers (for instance, demographic information; younger male drivers are more likely to speed than older female drivers), from historical DSI data, and/or from any other suitable source. General DSI data indicators include information used to identify a driver not based on a particular user; for instance if a mobile electronic device is positioned in the driver's seat of a vehicle, it is likely that the user of the mobile electronic device is the driver.

The conclusions indicated from multiple sources of DSI data may be weighted in making a final determination. As with the case of collecting the driving-pattern signature, the driver status may not be determined until the vehicle is in route or has completed travel. Other signals may afford immediate detection of driver status upon entering the car. However, the DSI data throughout an entire trip or significant portion of a trip may be considered.

Figure 7A:
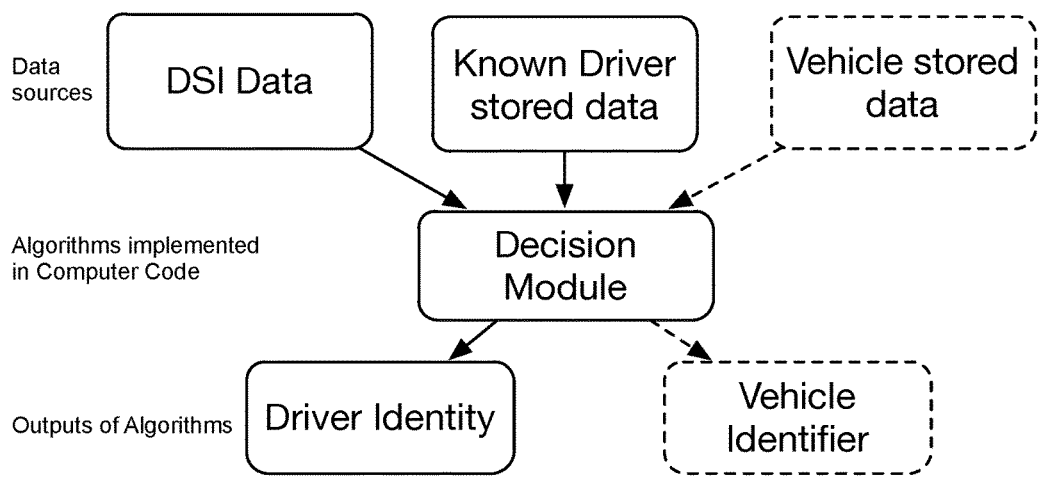
FIGS. 7A-7B are schematic representations of variations of elements of the method performed by a computing system.
Figure 7B:
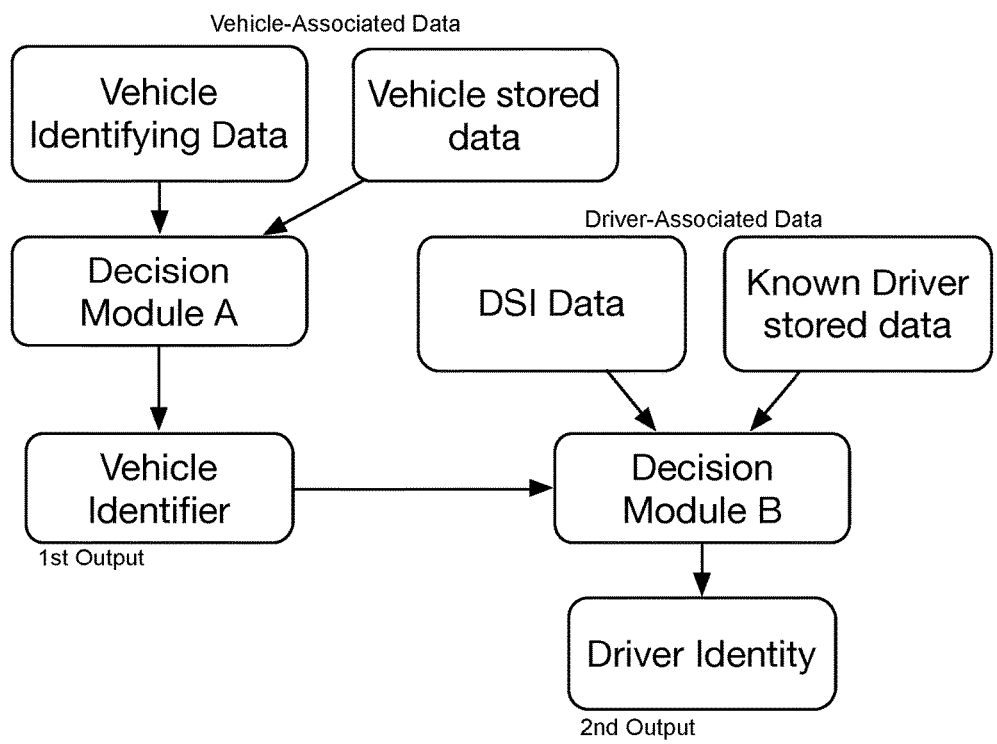

Any suitable elements of S150 (and/or other suitable elements of the method) can be performed by a computing system comprising one or more computing subsystems implemented in one or more of: a personal computer, a mobile computing device, a server, a cloud-based computing system, and/or any other computing device. For example, any or all of these elements can be performed by and/or with one or more decision modules (e.g., as shown in FIGS. 7A-7B), and the method can include providing instructions in computer code corresponding to any or all of the modules, as described above and below. The modules can use one or more of: regression, classification, neural networks (e.g., convolutional neural networks), heuristics, equations (e.g., weighted equations, etc.), selection (e.g., from a library), instance-based methods (e.g., nearest neighbor), regularization methods (e.g., ridge regression), decision trees, Bayesian methods, kernel methods, probability, deterministics, or any other suitable method. In a specific example, a decision module can determine a score corresponding to each known driver based on the DSI data (e.g., based on similarity of the DSI data to previously-collected data associated with the known driver, based on likelihood of the known driver to generate data similar to the DSI data, etc.), and if one of the scores exceeds a threshold (e.g., constant threshold, dynamically determined threshold, shared threshold, driver-specific threshold, etc.), the decision module can select the corresponding known driver (e.g., determine that the driver of the vehicle is the known driver corresponding to that score). In this specific example, if multiple scores exceed the threshold, the driver corresponding to the highest score can be selected. In this specific example, as additional DSI data is collected, the decision module can update the scores based further on the additional DSI data, and can revise a driver determination (or lack thereof) based on the updated scores. However, the decision modules can operate in any other suitable manner.

Step S150, which includes recording the driver status, functions to log telematic data with the appropriate driver. The driver status is preferably logged along with telematic data, and the data is preferably transmitted from the telematic application to the remote telematic platform. Telematic data is preferably stored for a user if the telematic application is in a driver mode (i.e., the user of the device is predicted to be driving). Telematic data may optionally not be persistently stored if the telematic application is in a passenger mode. However, passenger data may be used in particular applications and so telematic data while in a passenger mode may optionally be stored. Additionally, if the driver is determined to be a user other than the one directly associated with the device, the telematic data may be associated with the determined driver. In some described variations, a vehicle identity (or other vehicle identifier) may be determined. A determined vehicle identity can additionally be associated with stored telematic data. Telematic data that is confidently associated with a particular driver can be used to more accurately evaluate the driver quality of various users, which may have particular applicability to companies providing vehicle insurance.

2. Systems for Determining a Driver in a Telematic Application

Figure 6:
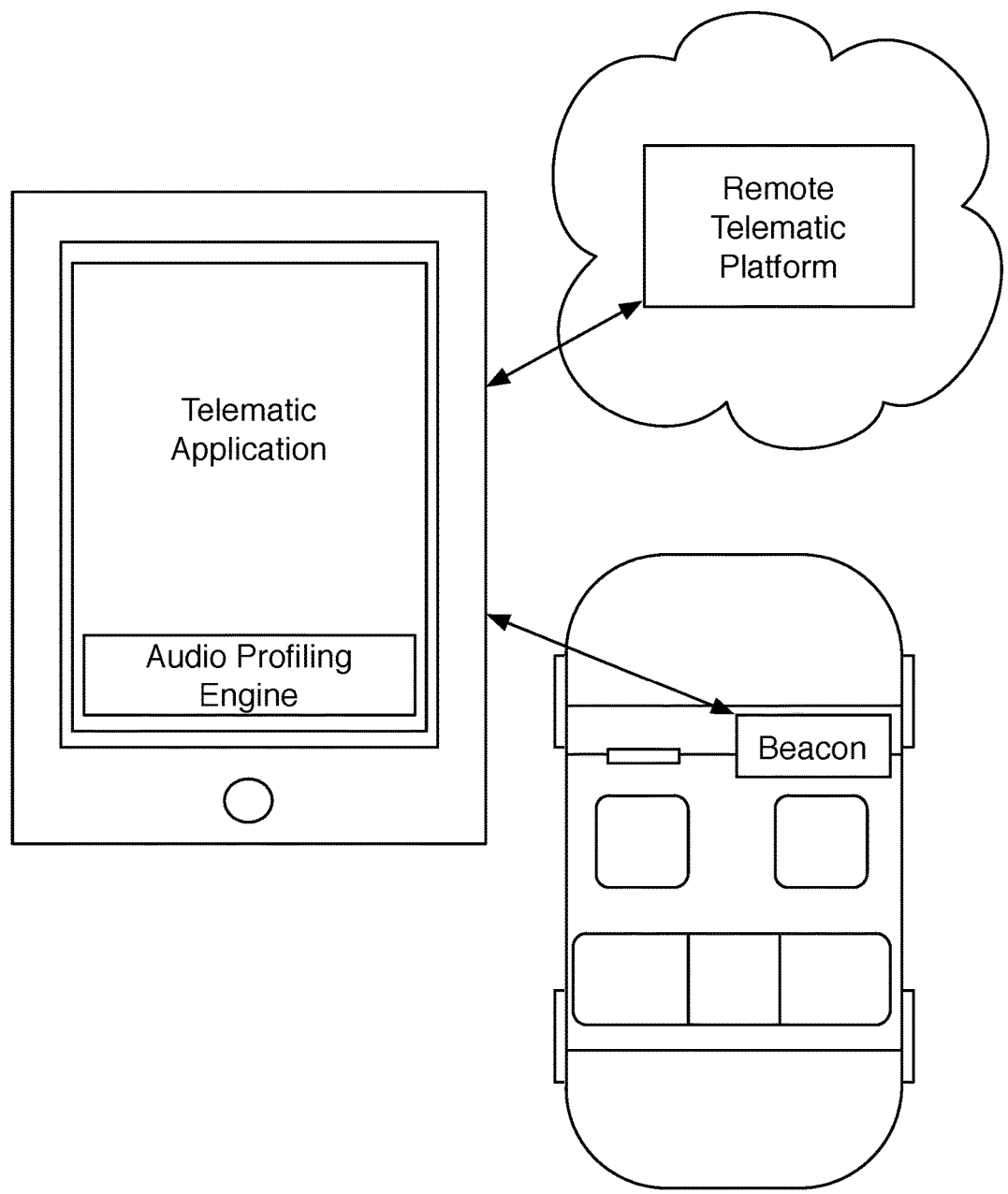
FIG. 6 is a schematic representation of a system of a preferred embodiment.

As shown in FIG. 6, a system for determining a driver in a telematic application functions to detect if the operating device is in a driving mode or a passenger mode through at least a telematic application. The methods of determining driving status may be performed through several various approaches as are described herein. The system may additionally be configured in various alternative embodiments to support the process of detecting a driver. The techniques of determining a driver may rely upon car-based devices, audio detection, and/or physical event detection. The system may additionally include a remote telematic platform that can be communicatively coupled to the telematic application to facilitate in managing and/or processing data according to any one or more algorithms associated with the method 100 described above.

The telematic application functions to primarily coordinate the collection of telematic data and determination of driver status. The telematics application is preferably programmed in computer code and executes at an associated user device upon installation of the telematics application onto the user device. An instance of the telematic application is preferably associated with a user identity or account. Preferably, a user signs in with account credentials into the application. The telematic application is preferably operable on a mobile device. The mobile device is preferably a mobile phone, but may alternatively be a wearable computing device, a tablet, a personal data-logging device, or any suitable device. The telematic device application is preferably an application downloaded and installed on the device, but the application may alternatively be embedded in the device or installed on the device in any suitable manner. The telematic device application may at least partially operate in the background, but the telematic application may additionally include a user-facing interface. Telematic data and history data may be viewed from the user interface. Additionally, the user interface may be used to explicitly receive confirmation of if the primary user is a driver or a passenger. The background operation of the telematic device application preferably functions to detect and record vehicle data. The telematic device application may additionally interface with services provided by the operating system or other frameworks to efficiently monitor and collect telematic data.

The telematic device application can preferably provide data on location and routes, movements, driving patterns (e.g., steering and braking characteristics), and other properties. The telematic device application preferably includes interfaces to services and sensors of the device such as GPS sensors, location services, accelerometers, gyroscopes, presence sensors, and/or any suitable input signal accessible by the application. The telematic data may be used with outside data sources to correlate additional properties of driving. The additional properties of driving may be generated on the telematic device application or alternatively by the remote telematic data platform.

The remote telematic platform functions to host, process, and share data. The remote telematic platform is preferably a multitenant platform that is used by multiple instances of the telematic device application. The remote telematic platform preferably includes an account system and a telematic data storage system to store driving log data. The driving log data is preferably stored in association with a driver. The driving log data may additionally or alternatively include parameters for vehicle identity and passengers. The telematic device application preferably periodically syncs collected data with the remote telematic platform. The remote telematic platform is preferably an internet accessible platform that may be implemented on a computer cluster, a distributed computing environment, a dedicated server, or any suitable hosting architecture.

In one preferred embodiment, the system may include at least one beacon, which functions to be a signal to the telematic application. In one variation, the beacon is an active beacon that transmits some signal that is received by the telematic application. The active beacon may transmit a signal to facilitate determining the distance between the beacon and the device. The beacon may use any suitable range finding sensing technique such as using time of flight distance measurements, signal strength, or other suitable techniques. The system may additionally include two beacons to facilitate triangulation. The active beacon may alternatively or additionally transmit a signal to facilitate in communicating an identity code associated with the token. A beacon may use light signals (e.g., infrared), ultrasound, Bluetooth, Wifi, NFC, RFID, and/or other suitable mediums when transmitting to the telematic application on the device.

The beacon may alternatively be a passive device that functions as an identifier for the telematic application. The beacon is preferably a physical device that can be placed, mounted, affixed, inserted, or otherwise coupled to a vehicle.

In another preferred embodiment, the system may include an audio profiling engine. The audio profiling engine is preferably a module configured for performing audio collection, characterizing audio, and matching signatures. The audio profiling engine preferably uses a microphone of the device to collect audio input. The audio input is sampled and converted into signatures that can be algorithmically matched.

In a variation of the preferred embodiment, the telematic application may send a notification to the user when active usage is detected during vehicular travel. The notification can serve as a reminder to not operate the device while driving and also to receive explicit confirmation that the user is a passenger.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the telematic device application and the remote telematic platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

I claim:

1. A method for driver identification comprising:
   movably coupling a user device to a vehicle;
   at an accelerometer of the user device, sampling a set of acceleration data during a time period, wherein the set of acceleration data characterizes vehicle motion during the time period;
   at a GPS receiver, sampling a set of GPS data during the time period;
   based on the set of acceleration data, determining a movement state of the vehicle indicative of vehicular travel during the time period at a speed within a speed range characteristic of the vehicle;
   based on the set of acceleration data, determining a vehicle identifier of the vehicle; and
   based on the vehicle identifier, the set of acceleration data, and the set of GPS data, determining an identity of a driver operating the vehicle throughout the time period.

2. The method of claim 1, wherein movably coupling the user device to the vehicle comprises coupling the user device to the vehicle through the driver.

3. The method of claim 2, wherein the user device is retained by an article of clothing of the user.

4. The method of claim 1, wherein the user device is retained against the vehicle by a gravitational force.

5. The method of claim 1, further comprising generating, based on the set of acceleration data and the set of GPS data, a set of isolated device motion data reflective of relative movement of the user device with respect to the vehicle; wherein the vehicle comprises the GPS receiver; wherein the identity of the driver is determined based further on the set of isolated device motion data.

6. The method of claim 1, further comprising sampling a set of vehicle identification data during the time period at the user device; wherein the identity of the driver is determined based further on the set of vehicle identification data.

7. The method of claim 6, wherein:
sampling a set of vehicle identification data comprises sampling, at a microphone of the user device, a set of characteristic vehicle audio data emitted by the vehicle; and
the identity of the driver is determined based further on the set of characteristic vehicle audio data.

8. The method of claim 1, further comprising determining a relative position of the user device with respect to the vehicle, wherein the identity of the driver is determined based further on the relative position.

9. The method of claim 8, wherein determining the relative position comprises:
at the user device, sampling a set of beacon signal data; and
determining the relative position based on the set of beacon signal data.

10. A method for driver identification comprising:
movably coupling a user device to a vehicle;
at the user device, determining a state of the vehicle, the state indicative of vehicular travel during a time period;
at the user device, determining a relative position of the user device with respect to the vehicle during the time period;
based on the relative position of the user device with respect to the vehicle, determining a vehicle identifier of the vehicle;
at an accelerometer of the user device, sampling a set of acceleration data during the time period;
at a GPS receiver, sampling a set of GPS data during the time period; and
based on the vehicle identifier and the set of acceleration data and the set of GPS data, determining an identity of a driver operating the vehicle throughout the time period.

11. The method of claim 10, wherein movably coupling the user device to the vehicle comprises coupling the user device to the vehicle through the driver.

12. The method of claim 10:
further comprising sampling, at a microphone of the user device, a set of vehicle audio data emitted by the vehicle; and
wherein the vehicle identifier is determined based further on the set of vehicle audio data.

13. The method of claim 10:
further comprising sampling a set of vehicle motion data; and
wherein the vehicle identifier is determined based further on the set of vehicle motion data.

14. The method of claim 10, wherein determining the relative position comprises:
at the user device, sampling a set of beacon signal data; and
determining the relative position based on the set of beacon signal data.

15. The method of claim 14, further comprising emitting a sonic beacon signal at a sound system of a vehicle; wherein:
sampling the set of beacon signal data comprises sampling a set of sonic data corresponding to the sonic beacon signal using a microphone of the mobile electronic device; and
the relative position is determined based further on the set of sonic data.

16. The method of claim 15, wherein:
emitting the sonic beacon signal comprises emitting a first sound defining a first frequency and a second sound defining a second frequency, the first and second frequencies substantially similar, the first and second sounds cooperatively defining a phase offset; and
determining the relative position comprises:
determining a sonic interference characteristic based on the set of sonic data; and
determining the relative position based on the sonic interference characteristic, the first frequency, and the second frequency.

17. The method of claim 10:
further comprising sampling, at a microphone of the user device, a set of characteristic vehicle audio data emitted by the vehicle; and
wherein the vehicle identifier is determined based further on the set of characteristic vehicle audio data.

* * * * *